US012429616B2

(12) United States Patent
Fu

(10) Patent No.: US 12,429,616 B2
(45) Date of Patent: Sep. 30, 2025

(54) NOISE ATTENUATION METHODS APPLIED DURING SIMULTANEOUS SOURCE DEBLENDING AND SEPARATION

(71) Applicant: BP Corporation North America Inc., Houston, TX (US)

(72) Inventor: Kang Fu, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 432 days.

(21) Appl. No.: 17/760,899

(22) PCT Filed: Aug. 27, 2020

(86) PCT No.: PCT/US2020/048182
§ 371 (c)(1),
(2) Date: Mar. 16, 2022

(87) PCT Pub. No.: WO2021/055152
PCT Pub. Date: Mar. 25, 2021

(65) Prior Publication Data
US 2022/0342103 A1 Oct. 27, 2022

Related U.S. Application Data

(60) Provisional application No. 62/901,961, filed on Sep. 18, 2019.

(51) Int. Cl.
*G01V 1/36* (2006.01)
(52) U.S. Cl.
CPC ........ *G01V 1/364* (2013.01); *G01V 2210/127* (2013.01); *G01V 2210/3248* (2013.01)
(58) Field of Classification Search
CPC ............. G01V 1/364; G01V 2210/127; G01V 2210/3248
See application file for complete search history.

(56) References Cited

U.S. PATENT DOCUMENTS 6,754,590 B1 * 6/2004 Moldoveanu .......... G01V 1/006
702/14
8,295,124 B2 10/2012 Abma
(Continued)

FOREIGN PATENT DOCUMENTS

GB        2520124 A      5/2015
JP        5121694 B2 *   1/2013
WO    2010/0109957 A1   2/2010

OTHER PUBLICATIONS

Machine translation of JP5121694B2 (Year: 2013).*
(Continued)

*Primary Examiner* — Lee E Rodak
*Assistant Examiner* — Sangkyung Lee
(74) *Attorney, Agent, or Firm* — CONLEY ROSE, P.C.

(57) ABSTRACT

A device may include a processor that may separate or deblend signals acquired with simultaneous source shooting, in an environment with background noise or other types of noises. The processor may expand a receiver gather before the time of source excitation. The processor may use the expanded time window (e.g., negative time window) to allocate the background noise or other types of noises after removal. The processor may use signal recovery operations to reallocate leaked or misplaced signals created during the separation iterations, including the signals inside the expanded time window, to a correct source excitation and timing. Expanding a receiver gather time window and reallocating leaked or misplaced signals may improve a deblended output used in generating a seismic image.

10 Claims, 9 Drawing Sheets

(56) References Cited

U.S. PATENT DOCUMENTS

| | | | |
|---|---|---|---|
| 9,817,143 B2* | 11/2017 | van Groenestijn | G01V 1/364 |
| 10,224,900 B2* | 3/2019 | Poole | G01V 20/00 |
| 11,112,518 B2* | 9/2021 | Poole | G01V 1/364 |
| 2009/0168600 A1 | 7/2009 | Moore et al. | |
| 2010/0299070 A1* | 11/2010 | Abma | G01V 1/37 702/14 |
| 2015/0241587 A1 | 8/2015 | Baardman | |
| 2015/0253443 A1* | 9/2015 | Hornbostel | G01V 1/38 367/15 |
| 2015/0293249 A1* | 10/2015 | Peng | G01V 1/364 702/16 |
| 2016/0245943 A1* | 8/2016 | Rohnke | G01V 1/364 |
| 2017/0068011 A1* | 3/2017 | C. | G01V 1/30 |
| 2018/0164455 A1* | 6/2018 | Elboth | G01V 1/30 |
| 2020/0292725 A1 | 9/2020 | Fu | |

OTHER PUBLICATIONS

PCT/US2020/048182 International Search Report and Written Opinion dated Feb. 3, 2021 (21 p.).

Araz, Mahdad et al., "Separation of Blended Data by Iterative Estimate and Subtraction of Blending Interference Noise," Geophysics vol. 76, No. 3, May 1, 2011 (21 p.).

PCT/US2020/048182 Submission of Informal Comments to the International Search Report and Written Opinion dated Feb. 3, 2021; Submission filed Apr. 14, 2021 (5 p.).

Singapore Search Report and Written Opinion dated Sep. 27, 2024, for Singapore Application No. 11202202657U (14 p.).

Ibrahim, Amr Ahmed Mahmoud, "Separating Simultaneous Seismic Sources Using Robust Inversion of Radon and Migration Operators," Nov. 28, 2017, Department of Physics, University of Alberta (https://arxiv.org/pdf/1711.10214) (185 p.).

* cited by examiner

NOISE ATTENUATION METHODS APPLIED DURING SIMULTANEOUS SOURCE DEBLENDING AND SEPARATION

CROSS-REFERENCE TO RELATED APPLICATIONS

This application is a 35 U.S.C. § 371 U.S. National Stage Entry application of PCT/US2020/048182 filed Aug. 27, 2020, and entitled "Noise Attenuation Applied During Simultaneous Source Deblending and Separation," which claims benefit of U.S. provisional patent application Ser. No. 62/901,961 filed Sep. 18, 2019, and entitled "Noise Attenuation Applied During Simultaneous Source Deblending and Separation," each of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure generally relates to seismic image generation and, more specifically, to noise attenuation techniques to be used as part of existing deblending operations and separation operations to reduce amounts of noise and improve amounts of recovered weak amplitude signals in coherent signals recovered during simultaneous source acquisition.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending acoustic energy down into the ground and recording the reflected acoustic energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave, acoustic wave) signal that travels downward through the Earth, is reflected, and, upon its return, is recorded using one or more seismic receivers disposed on or above the subsurface region of the Earth. The seismic data recorded by the seismic receivers may then be used to create an image or profile of the corresponding subsurface region.

Over time, as hydrocarbons are extracted from the subsurface region of the Earth, the location, saturation, and other characteristics of the hydrocarbon reservoir within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and seismic receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced based on seismic waveforms produced by a source that reflect off regions within a subsurface and are received by seismic receivers. The seismic image may be constructed using a high resolution seismic velocity model, such as a full waveform inversion (FWI) model, a tomography model, or the like, applied, for example, via a velocity model builder. The seismic velocity model may include data indicative of a change in velocity of the seismic waveforms during propagation through the subsurface region. The source that produces the seismic waveforms may be an active source (e.g., anthropogenic sources of seismic waves such as explosives or airguns), or a passive source (e.g., non-anthropogenic such as waves or wind). Certain techniques employ active sources due to the resulting high signal-to-noise ratio (SNR) of the seismic waveforms. Passive sources may complement active source seismic surveys. For example, passive sources may be utilized in the generation of velocity models of a near surface region (e.g., less than approximately 500 meters (m) below the surface of the Earth and/or a seafloor).

In addition to the examples provided above, image and/or data registration techniques may be used for various applications in seismic data processing, as described herein. For example, the systems and methods described below may be used for noise attenuation while seismic signals are received with simultaneous source data acquisition. To elaborate, sometimes simultaneous sources are used to gather data to generate a seismic image. Simultaneous sources may provide many benefits in the generation of a seismic image, such as improved efficiency, improved resulting seismic images, and reduced cost, relative to non-simultaneous sources. However, simultaneous sources sometimes lead to particular challenges too, such as the blending noise generated by the interferences of simultaneous sources mixing with other types of incoherent noise (e.g., the ocean swell noise, background ambient noise). Since blending noise is vulnerable to being inadvertently removed and/or filtered away by some noise attenuation approaches (e.g., predictive deconvolution) and the quality of inversion-based separation methods for separating interfering simultaneous sources is based on preserving the integrity of the blending noise, it may be difficult to remove the other types of incoherent noise without interfering with the blending noise. Another challenge encountered when separating interfering simultaneous sources is that the amplitude of the other types of incoherent noises may be relatively stronger than overlapping weak amplitude coherent signals. When deblending is performed without isolating the other types of incoherent noises, the disparity between the amplitude strengths may lead to an inadequate result from deblending operations.

In non-simultaneous source acquisition, seismic sources may be shot with long enough time intervals to cause many or all desired seismic signals generated from a previous shot to be recorded before the next shot is fired. However, in simultaneous source acquisition, the time intervals may be smaller than the time used to record a complete shot. Thus, seismic signals generated from neighboring shots may blend together.

The recorded seismic data is typically sorted into two-dimension (2-D), three-dimension (3-D), or even higher dimension traces for processing. Due to the continuity of geology of the Earth, the Earth-reflected signals may be coherent in the domain of 2-D, 3-D, or higher dimensions. However, the blending noise, which refers to signals received during data collection periods that interfere with a current data collection period, may be read as noise in certain 2-D, 3-D, or higher dimension domains due to the spatial misalignment in the source excitation time, despite being the replica of a primary signal (e.g., coherent energy or signal) for a subsequent input data (e.g., input seismic data) collection period. Deblending (used interchangeable herein with "deblending operation" or "deblending operations") refers to the techniques used to separate the signals such that signals generated by each shot are placed into the right data collection periods. In this way, the blending noise may refer to signals misplaced that are to be recovered and associated with their corresponding primary signals (e.g., corresponding coherent energy in a subsequent data collection period). There may be other types of noise present in the seismic data as incoherent or coherent as the blending noise, making it difficult to remove the other types of noise without affecting or at least partially removing the blending noise.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Improvements to the processing of the seismic data and subsequent image generation may be made through the use of noise attenuation techniques during the signal separation of data acquired with simultaneous source seismic acquisition. As described herein, these improvements include changes to typical operation to enhance deblending operations. Enhanced deblending operations may include expanding a gather window to include seismic data before a time of a seismic source excitation such that during processing at least some seismic data noise is transferred to a portion of the dataset corresponding to the time duration before the time of the seismic source excitation to attenuate at least a portion of ambient noise signals in a final processing output.

Figure 1:
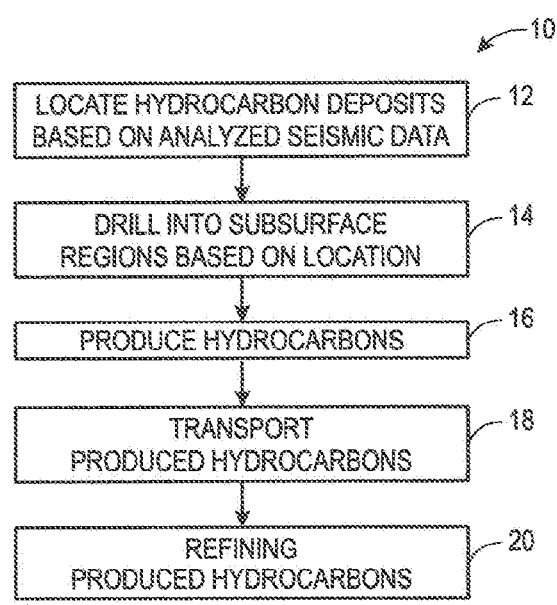
FIG. 1 illustrates a flow chart of various processes that may be performed based on analysis of seismic data acquired via a seismic survey system, in accordance with embodiments presented herein.
Figure 2:
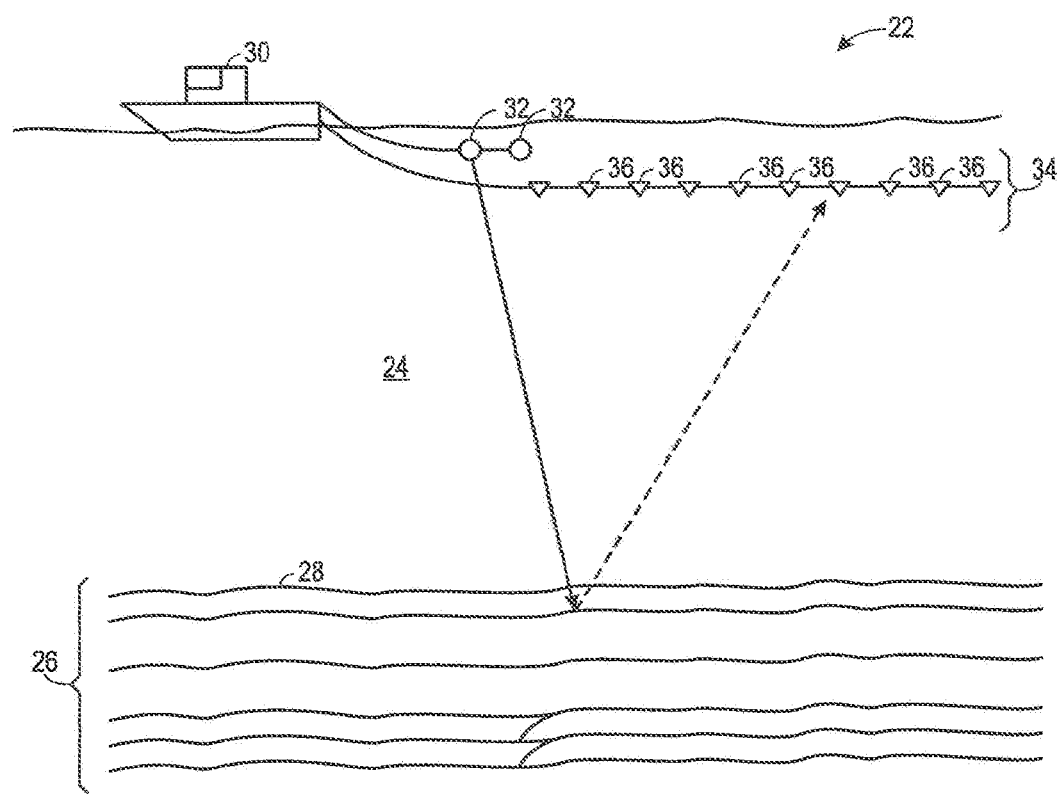
FIG. 2 illustrates a marine survey system in a marine environment, in accordance with embodiments presented herein.
Figure 3:
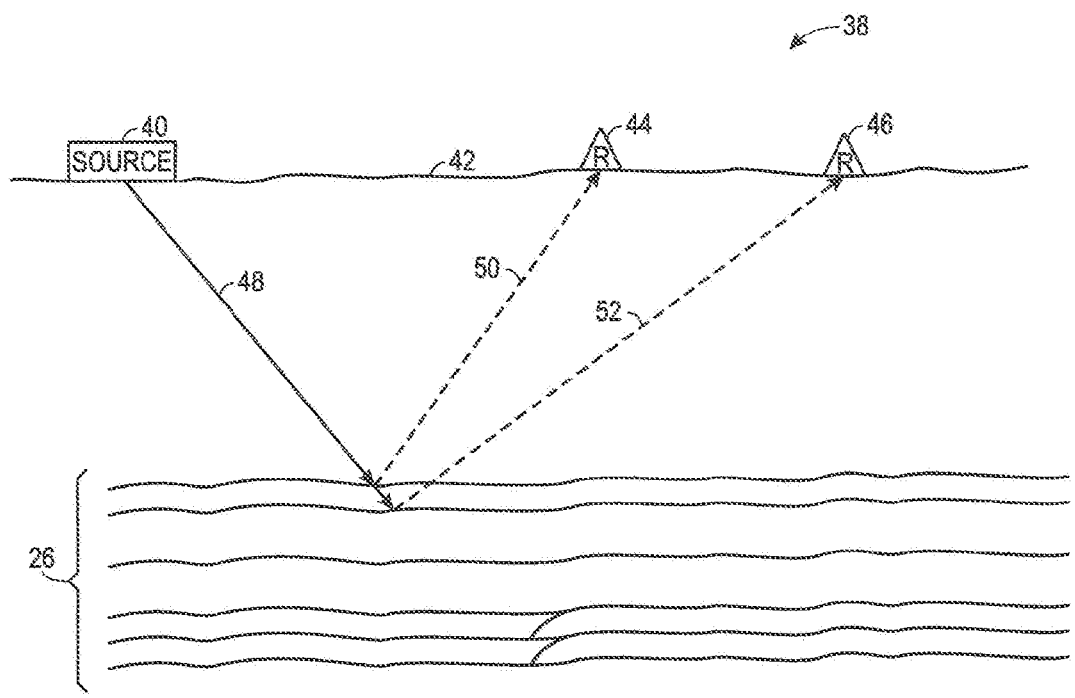
FIG. 3 illustrates a land survey system in a land environment, in accordance with embodiments presented herein.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and use the results of the seismic data analysis (e.g., seismogram, map of geological formations, or the like) to perform various operations within the hydrocarbon exploration and production industries. For instance, FIG. 1 illustrates a flow chart of a method 10 that details various processes that may be undertaken based on the analysis of the acquired seismic data.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries, storage facilities, processing sites, and the like via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

Figure 2A:
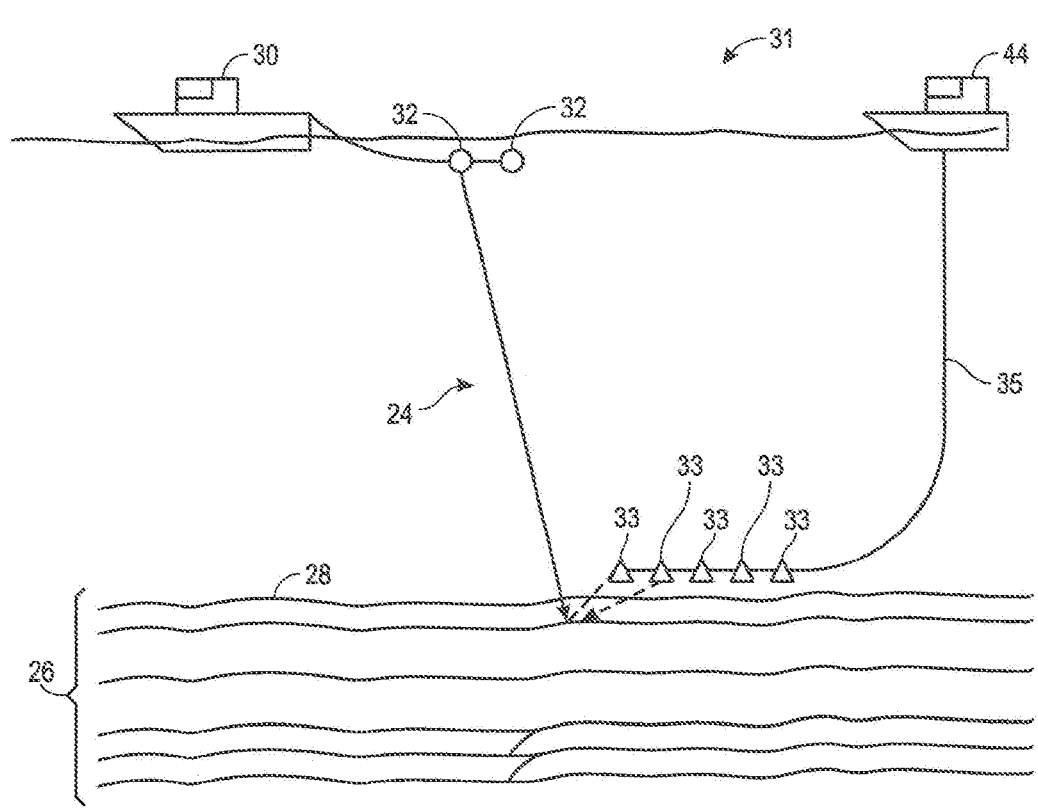
FIG. 2A illustrates a second marine survey system in a marine environment, in accordance with embodiments presented herein.

With the forgoing in mind, FIG. 2 and FIG. 2A illustrate two examples of a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a seismic streamer 34, a seismic receiver 36 and/or other equipment that may assist in acquiring seismic images representative of geological formations within a subsurface region 26 of the Earth. The seismic source 32 may include any combination of vibrational sources, airgun sources, sparker sources, and/or low-frequency sources. The vessel 30 may tow the seismic source 32 (e.g., an airgun array) that may produce energy, such as acoustic waves (e.g., seismic waveforms), that is directed at a seafloor 28. The vessel 30 may also tow the seismic streamer 34 having a seismic receiver 36 (e.g., hydrophones) that may acquire seismic waveforms that represent the energy output by the seismic sources 32 subsequent to being reflected off of various geological formations (e.g., salt domes, faults, folds, or the like) within the subsurface region 26. Additionally, although the description of the marine survey system 22 is described with one seismic source 32 (represented in FIG. 2 as an airgun array) and one seismic receiver 36 (represented in FIG. 2 as multiple hydrophones and/or geophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, seismic streamers 34, and the like to perform the operations of the marine survey system 22.

FIG. 2A illustrates an Ocean Bottom Seismic (OBS) system 31 as a second marine survey system (e.g., for use in conjunction with block 12 of FIG. 1) that also may be employed to acquire seismic data (e.g., waveforms) regarding a subsurface region of the Earth in a marine environment. The OBS system 31 may operate to generate seismic data (e.g., OBS datasets). While the illustrated OBS system 31 is an Ocean Bottom Cable (OBC) system inclusive of one or more receivers 33 disposed on the seafloor 28 coupled via a cable 35 to a second vessel 44, other embodiments of an OBS system 31, such as an Ocean Bottom Node (OBN) system or any other seismic system that produces higher signal-to-noise images at differing frequencies compared to those of the marine survey system 22 may be utilized.

As illustrated, the OBS system 31 may include a seismic source 32 (e.g., an airgun array) that is towed by a vessel 30 and which may produce energy, such as sound waves (e.g., seismic waveforms), that is directed at the seafloor 28. This energy may be reflected off of various geological formations within the subsurface region 26 and subsequently acquired (e.g., received and/or recorded) by the one or more receivers 33 disposed on the seafloor 28. For example, data may be stored in the one or more receivers 33 for an extended period of time (e.g., hours, days, weeks, or longer) prior to the stored data being retrieved (either via cable 35 or a remotely operated vehicle (ROV)). As illustrated, the one or more receivers 33 may be coupled to a vessel 44 (and, in some embodiments, to one another) via the cable 35. Data acquired via the one or more receivers 33 may be transmitted via the cable 35 to the vessel 44 (or, for example, a remotely operated vehicle (ROV) if the OBS system 31 is an OBN system).

In some embodiments, the OBS system 31 may be utilized to acquire OBS datasets that are useful in reservoir mapping and characterization. These OBS datasets typically have a bandwidth from approximately 2 Hz to 100 Hz with relatively high signal-to-noise ratio (SNR) results at low frequencies (e.g., at less than or equal to approximately 50 Hz, 40 Hz, 35 Hz, etc.) relative to 3 DHR datasets. Therefore, the OBS dataset is complementary with respect to bandwidth a 3 DHR dataset acquired via the marine survey system 22 (e.g., acquired via a 2D high-resolution seismic acquisition, a 3D high-resolution seismic acquisition, or the like).

Other non-marine seismic systems used to gather seismic data are additionally envisioned for use with the present techniques. For example, FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) may be disposed on a surface 42 of the Earth above the subsurface region 26 of interest. The seismic source 40 may produce energy (e.g., acoustic waves, seismic waveforms) directed at the subsurface region 26 of the Earth. Upon reaching various geological formations (e.g., salt domes, faults, folds) within the subsurface region 26, the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different seismic receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second seismic receiver 46 may receive the reflection of the seismic waveform 48 off of a different geological formation. As such, the first seismic receiver 44 may receive a reflected seismic waveform 50 and the second seismic receiver 46 may receive a reflected seismic waveform 52.

In some other embodiments, the seismic receivers 33 and 44/46 may be dispersed inside a well borehole in marine or land environment, via vertical seismic profile (VSP). In VSP seismic acquisition, the receivers along the well borehole may record the reflection and transmission waves emitted from the sea surface or land surface.

Figure 4:
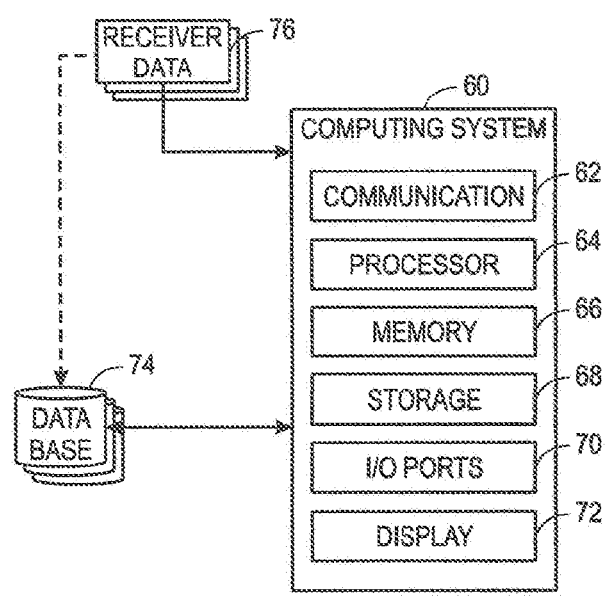
FIG. 4 illustrates a computing system that may perform operations described herein based on data acquired via the marine survey system of FIG. 2 and/or the land survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the seismic receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the seismic receivers 36, 44, 46, one or more databases 74, other computing devices, and other communication capable devices. In one embodiment, the computing system 60 may receive seismic receiver data 76 (e.g., seismic data, seismograms) previously acquired by seismic receivers via a network component, the database 74, or the like. The processor 64 of the computing system 60 may analyze or process the seismic receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable article of manufacture serving as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via seismic receivers of a seismic survey according to the embodiments described herein.

The memory 66 and the storage 68 may also store the data, analysis of the data, the software applications, and the like. The memory 66 and the storage 68 may represent tangible, non-transitory, computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 are interfaces that may couple to other peripheral components such as input devices (e.g., keyboard, mouse), sensors, input/output (I/O) modules, and the like. The I/O ports 70 may enable the computing system 60 to communicate with the other devices in the marine survey system 22, the land survey system 38, or the like.

The display 72 may depict visualizations associated with software or executable code processed via the processor 64. In one embodiment, the display 72 may be a touch display capable of receiving inputs from a user of the computing system 60. The display 72 may also be used to view and analyze results of any analysis of the acquired seismic data to determine the geological formations within the subsurface region 26, the location and/or properties of hydrocarbon deposits within the subsurface region 26, and/or the like. The display 72 may be any suitable type of display, such as a liquid crystal display (LCD), plasma display, or an organic light emitting diode (OLED) display. In addition to depicting the visualization described herein via the display 72, it may be noted that the computing system 60 may also depict the visualization via other tangible elements, such as paper (e.g., via printing), or the like.

With the foregoing in mind, the present techniques described herein may also be performed using a supercomputer employing multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, or the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and/or control certain operations of the seismic sources 32 or 40, the seismic receivers 36, 44, 46, or the like. Further, it may be noted that the listed components are provided as example components and the embodiments described herein are not to be limited to the components described with reference to FIG. 4.

In some embodiments, the computing system 60 (e.g., the processor 64 operating in conjunction with at least one of the memory 66 or the storage 68) may generate a two-dimensional representation or a three-dimensional representation of the subsurface region 26 based on the seismic data received via the seismic receivers mentioned above. Additionally, seismic data associated with multiple source/receiver combinations may be combined to create a near continuous profile of the subsurface region 26 that may extend for some distance. In a two-dimensional (2-D) seismic survey, the seismic receiver locations may be placed along a single line, whereas in a three-dimensional (3-D) survey the seismic receiver locations may be distributed across the surface in a grid pattern. As such, a 2-D seismic survey may provide a cross sectional picture (vertical slice) of Earth layers present beneath the recording locations. A 3-D seismic survey, on the other hand, may create a data "cube" or volume that may correspond to a 3-D picture of the subsurface region 26.

In addition, a four-dimension (4-D or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may include a very large number of individual seismic recordings (e.g., traces, seismic traces). As such, the computing system 60 analyze the acquired seismic data and obtain an image representative of the subsurface region 26. The computing system 60 may use the image to determine locations and/or properties of hydrocarbon deposits. To that end, a variety of seismic data processing algorithms may be used to remove noise from the acquired seismic data, migrate the pre-processed seismic data, identify shifts between multiple seismic images, align multiple seismic images, or the like.

After the computing system 60 analyzes the acquired seismic data, the results of the seismic data analysis (e.g., seismogram, seismic images, map of geological formations, or the like) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that include the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
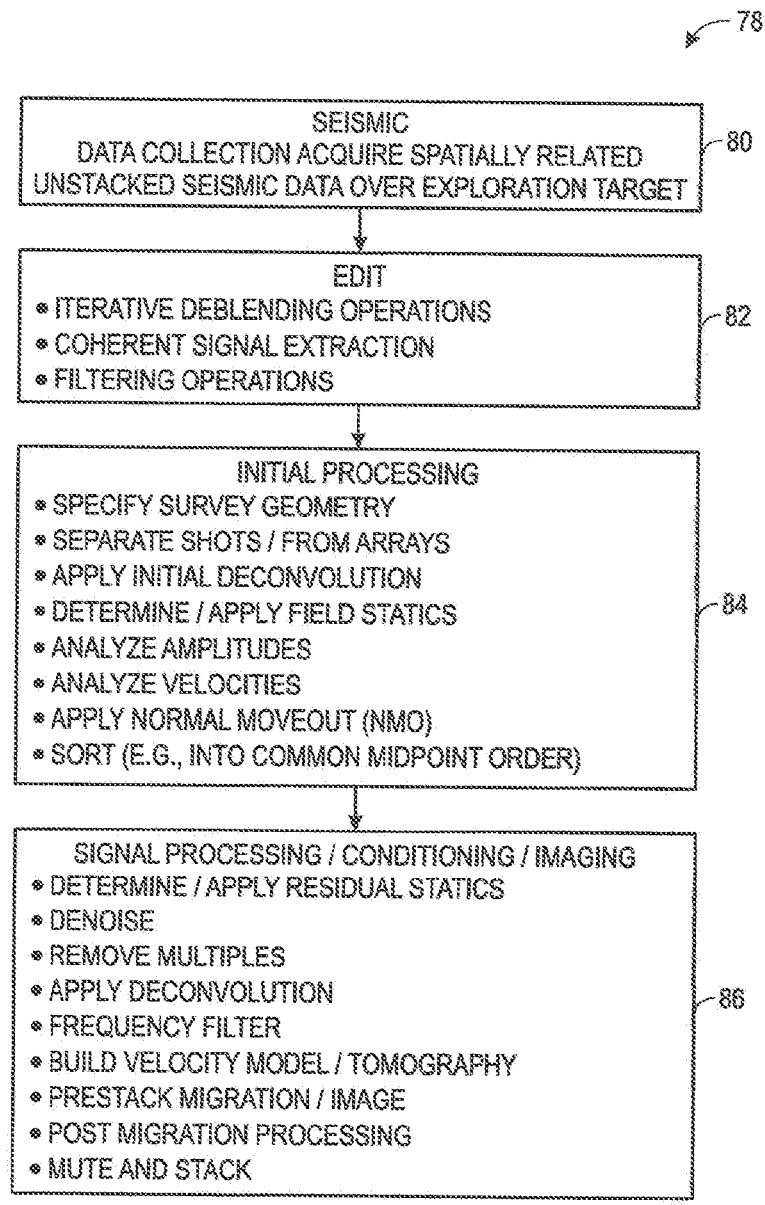
FIG. 5 illustrates a flow chart of a method for generating a seismic image via the computing system of FIG. 4, in accordance with embodiments presented herein.

In some embodiments, a seismic image may be generated in conjunction with a seismic processing scheme such as, for example, the method 78 illustrated in FIG. 5, by the computing system 60 (and more specifically, the processor 64 operating in conjunction with at least one of the memory 66 or the storage 68). As illustrated, method 78 includes a seismic processing sequence that includes a seismic data collection in block 80, editing of the seismic data in block 82, initial processing in block 84, and signal processing, conditioning, and imaging (which may, for example, include production of imaged sections or volumes) in block 86 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result of the method 78, location of hydrocarbons within a subsurface region 26 may be identified. As described above, the quality of seismic data may be improved by using the noise attenuation techniques described herein.

Figure 6C:
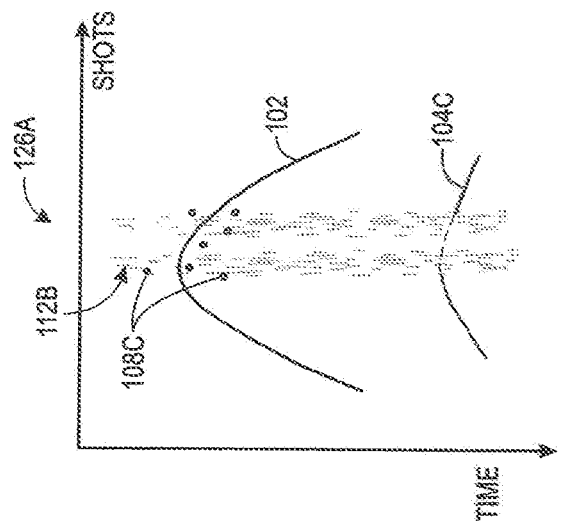
FIG. 6C illustrates a graph depicting the strong primary signal of FIG. 6A and the weak primary signal of FIG. 6A separated from the blending noise from the strong primary signal and the blending noise from the weak primary signal of FIG. 6A after recovering the weak primary signal from the residual blending noise of FIG. 6B, in accordance with embodiments presented herein.
Figure 6B:
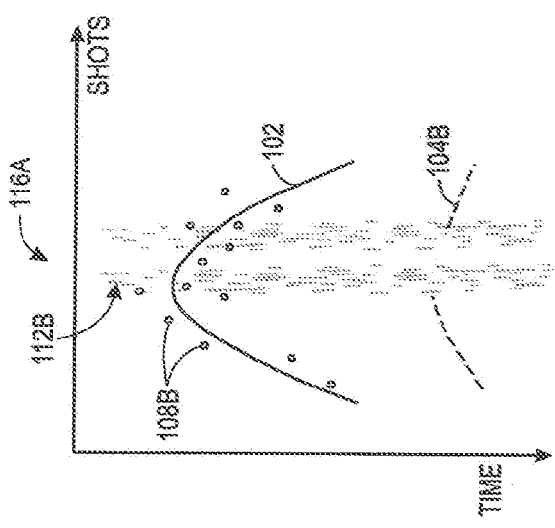
FIG. 6B illustrates a graph depicting the strong primary signal of FIG. 6A and the weak primary signal of FIG. 6A separated from the blending noise of FIG. 6A but presented with residual blending noise from the weak primary signal and a deteriorated weak primary signal, in accordance with embodiments presented herein.
Figure 6A:
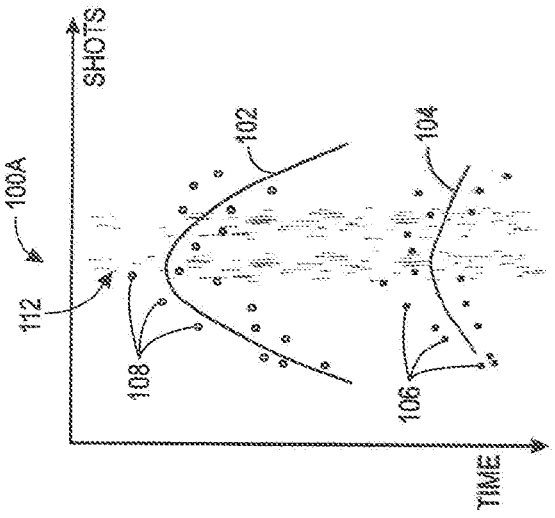
FIG. 6A illustrates a graph depicting a strong primary signal, a weak primary signal, blending noise from the strong primary signal and blending noise from the weak primary signal, in accordance with embodiments presented herein.

FIG. 6A illustrates a graph 100A depicting a strong primary signal 102, a weak primary signal 104, blending noise 106 of the strong primary signal 102, blending noise 108 of the weak primary signal 104, and other noise 112 (e.g., background swell noise). As described above, these signals may be initially generated by the seismic source 32 or multiple sources at different times. When performing simultaneous source acquisitions of seismic data, the seismic source 32 may transmit a first signal at a first time, and the same source or another source may transmit a second signal at a second time (e.g., a time later than the first time).

Although not outputted at the same time, the first signal and the second signal may be transmitted relatively close in time, such that there is a possibility of non-noise signal interference that is caused by the reception of the second signal during reception of the first signal. Thus, sometimes at least a portion of the second signal is received by the seismic receivers 36, 44, and/or 46 when the seismic receivers 36, 44, and/or 46 are expecting to receive the first signal.

In this way, the data gathered corresponding to the first signal may include data corresponding to the second signal. If this occurs, the second signal showing up in the data for the first signal may be considered to be non-noise signal interference, weak-coherence signals, or blending noise. Since the second signal may be different (e.g., affected by different formations than the first signal) than the first signal, preemptively combining the two signals for data analysis may be improper and subsequently cause interference in the data.

Excluding the noises generated by the background or equipment, the seismic recording can be considered to be a sum of primary signals with different time windows. In other words, each primary signal exists can exist within a different timeframe of the seismic recording. While predicting/determining the primary signals for each time window, any errors which result when predicting a primary signal in one time window may cause errors in other overlapping windows because the sum is fixed. Thus, correctly predicting the blending noise may be as beneficial to signal analysis as correctly predicting the coherent primary signals.

To help illustrate, the strong primary signal 102 may correspond to data gathered corresponding to the primary signal of multiple seismic source excitations (namely shots)

that travel through one or more features inside earth and return to a seismic receiver. For example, the seismic source 32 may have transmitted the first signal at a first time, and, at a later time, the seismic receivers 36, 44, and/or 46 may have received data corresponding to the first signal. Before the seismic receiver 36, 44, and/or 46 complete recording the first signal, the same seismic source 32, or a different source, may transmit another signal and get recorded. The seismic receivers 36, 44, and/or 46 may continue to record until at least a portion of the shots (e.g., some shots, many shots, all shots) have been recorded. Shifting the continuous recording to align the time zeros (of each seismic trace) to the times of seismic source excitations may generate the gather data (commonly called a common receiver gather or a gather, but herein referred to as "gather") depicted in the graph 100A. Data gathered includes data corresponding to the strong primary signal 102 (e.g., the actual signal associated with the main response of the signal from the seismic sources and multiple excitations toward one or more features or formations being analyzed as part of the seismic data collection, coherent signal), the weak primary signal 104 (e.g., coherent energy related to deeper subsurface features with weaker amplitude), the blending noise 106 (which is the same energy as the strong primary signal 102 except that the time zeros are misaligned with respect to when the shots are excited), and the blending noise 108 (which has the same energy as the weak primary signal 104 except that the time zeros are misaligned with respect to when the shots are excited). The blending noise 106 may overlap with weak primary signal 104 data, where weak primary signal 104 data is relatively weak compared to the strong primary signal 102 data and the blending noise 106.

Sometimes signal processing operations cause the discarding or disregarding of the blending noise 106. However, when using signal processing operations to isolate the primary signal 102 from the other signals, it may not be desirable to ignore the blending noise 108 and the weak primary signal 104. To isolate the primary signal 102 from the rest of the signals, separation operations may be performed on the gather data. However, these separation operations may inadvertently cause at least a misallocation of the blending noise 106 (e.g., a portion of weak primary signal 104 is allocated to be the predicted blending noise 106). In this way, valuable seismic data that overlaps with the primary signal 102 and blending noise 106 may be lost when the blending noise 106 is misestimated/misdetermined. As described in more detail below, separation operations may calculate a residual that generally corresponds to a difference between the recorded data and the estimated signal(s). When blending noise 106 is misestimated/misdetermined, for example, the residual of the blending noise may correspond to signal loss at a different time since the blending noise 106 represents the strong primary signal 102, or coherent energy, misplaced and sensed at a different time than expected. The valuable seismic data that overlaps with the strong primary signal 102 and the blending noise 106 may also be lost when the prediction of blending noise 106 is overestimated (i.e., where more data is allocated to the prediction of blending noise 106 than there should be) causing the weak primary signal 104 that overlaps with the blending noise 106 to be lost.

FIG. 6B illustrates the results from the deblending and/or separation operations on the gathered data, in particular FIG. 6B illustrates a graph 116A depicting the results after the strong primary signal 102 and the weak primary signal 104 have been separated from the other signals of the graph 100A. Although the strong primary signal 102 is shown as recovered from the operations, it is not sufficient to merely discard the data that is associated with the other signals since there may be hidden primary signal data within these other signals, for example, data of weak primary signal 104 can be hidden. The hidden primary signal data is to be associated with other primary signal data in order to facilitate complete data gathering. In this case, the strong primary signal 102 and its blending noise 106 are overestimated (where energy corresponding to other signals are misallocated as being a part of strong primary signal 102 and blending noise 106), and thus some of the energy corresponding to weak primary energy 104 has leaked into the prediction of strong primary signal 102 and its blending noise 106, which may result in the appearance of residual blending noise 108B of the weak primary signal 104 and the appearance of a weakened primary signal 104B. To perform the deblending and/or separation operation with the leaked energy recovered, multiple coherent and non-coherent energies separations in the same domain and/or in different domains are combined via combing, blending, and subtraction with the original blended continuous data during processing iterations to suitably recover primary signals from other signals, such as the blending noise 108B. Further details regarding these deblending operations are discussed in recently filed U.S. Patent Provisional Application No. 62/819,145, filed Mar. 15, 2019. It should be noted that the residual noise is not derived exclusively from the weak primary signal 104 and its blending noise 108. For example, strong primary signal 102 and its blending noise 106 may also have residual noise which may be treated with the same techniques.

Besides the blending noise generated due to simultaneous source seismic acquisition, there may be noises generated by other sources, such as ocean swell noise during marine acquisition, other seismic interference noise from a nearby seismic survey, wind noise, vehicle noise, or the like. These noises are mixed with blending noise and may have a consistent amplitude through the recording time window. This may be in contrast to amplitudes of seismic signals that tend to decay with time due to attenuation associated with travelling through the Earth. The noise 112 is incoherent but may have stronger amplitude than the weak primary signal 104. During the prediction of primary signals and the blending noise, it is likely that these noises are smeared into noise 112B and leaked into a prediction of the primary signal and of the blending noise. When attempting to predict weak primary signal 104, the prediction of weak primary signal 104 is deteriorated when the noise 112 is overlapped with the primary signal 104.

FIG. 6C illustrates a graph 126A depicting the strong primary signal 102 and the weak primary signal 104C and the blending noise 108C. The weak primary signal 104C may include some of the residual blending noise 108B. This may be achieved by the recovery of residual blending noise 108B in FIG. 6B. Before using the signal recovery techniques, the leakage of the weak primary signal 104 into the blending noise 106 (or the leakage of the blending noise 108 into strong primary signal 102) accumulate after iterations of deblending, or separation operations, and may cause signal loss. However, using the recovery techniques, the residual blending noise 108B may be partially separated from the strong primary signal 102 and further returned to the weak primary signals 104 originally associated with the residual blending noise 108B. However, the presence of other types of noise 112B may reduce an effectiveness of the operations, leaving some of the weak primary signal 104 remaining near stronger primary signals 102, depicted as weak primary signal 104C and noise 108C.

The noise 112B may remain in the output of the deblending operation, as shown in FIG. 6C. It may be desirable to attenuate the noises, especially around the weak signal 104, where the strong noise may lead to a low signal to noise (S/N) ratio. By using the modified deblending techniques herein, one or more embodiments can attenuate these noises, especially near the weak primary signals, improving a quality of deep subsurface imaging.

Figure 7:
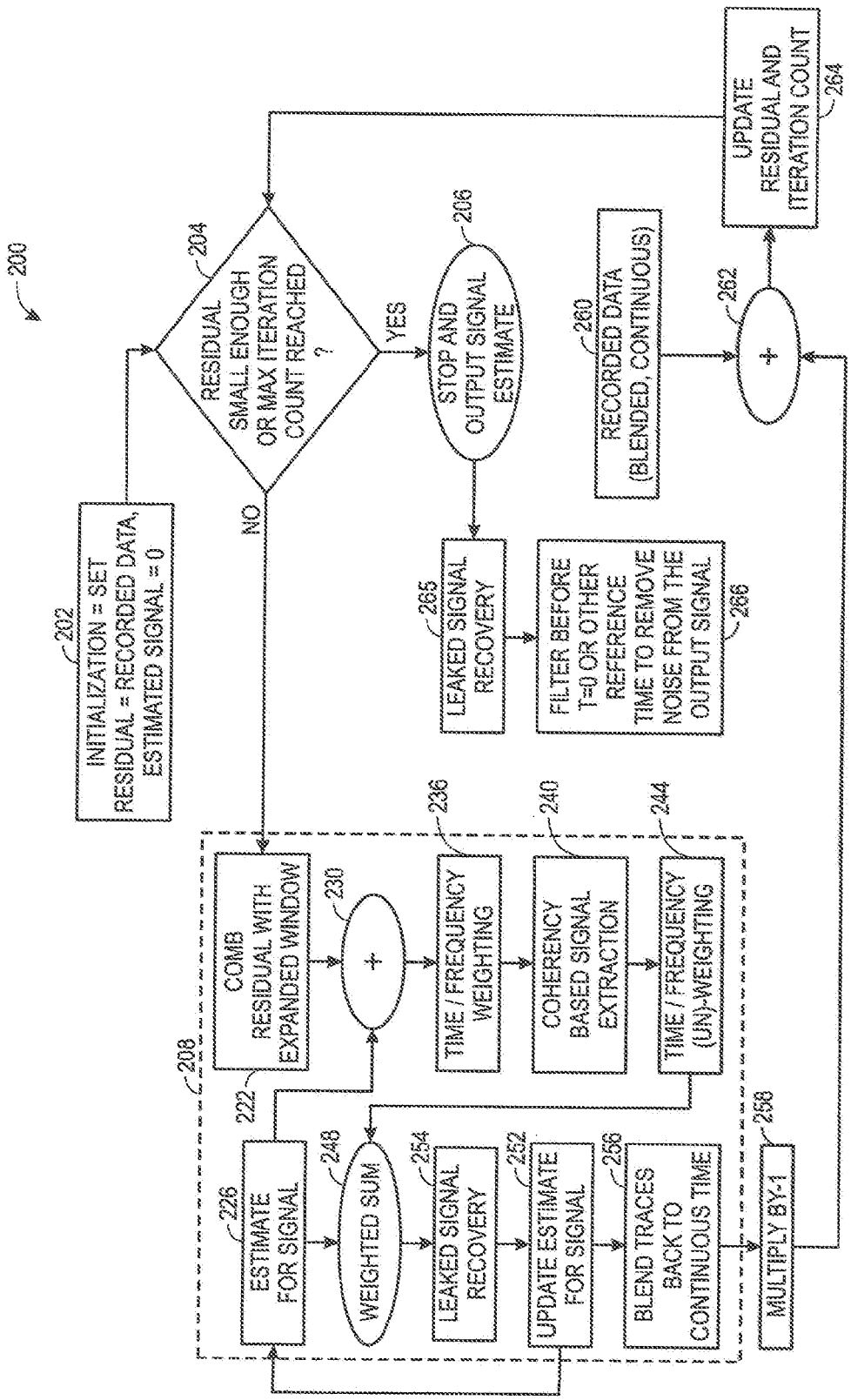
FIG. 7 illustrates a flowchart of a method for inversion-based deblending operations that leverage an expanded window (e.g., an expanded gather window), in accordance with embodiments presented herein.

FIG. 7 illustrates a flow chart of a method 200 for inversion-based deblending operations. Although the method 200 is described as being performed by the computing system 60, it should be understood that the method 200 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory, computer-readable medium).

At block 202, the computing system 60 may initialize a data set (e.g., initialization: set). The computing system 60 may generate or allocate in memory 66 a number of data buffers or data stores to store future calculation results. For example, two data buffers may be generated, where a first data buffer may store calculated residuals and a second data buffer may store deblended airgun data. Residuals generally correspond to a difference between the recorded data and a sum of the estimated signals. The first data buffer may initially store a copy of the recorded seismic data (replaced after future calculations with a residual value), while the second data buffer may initially store zero data. It is noted that additional buffers, and additional processing sequences, may be added to the method 200 to accommodate multiple source deblending operations.

At block 204, the computing system 60 may determine whether the initial residual is suitably small (e.g., equals zero, is less than a threshold amount, and/or equals a residual threshold value associated with a suitably small residual value) and/or whether an iteration count threshold is met (e.g., an iteration threshold associated with a maximum number of times the value of the residual may be iteratively updated). If the residual is suitably small, the original data may be considered completely deblended. When the original data is deblended, the signal estimate (e.g., deblended output) has changed from the original initialization value (e.g., zero) to non-zero data. However, if the residual is not suitably small, the computing system 60 may perform various processing operations to try to adjust the residual value to the threshold value (e.g., a value that is suitably small). The computing system 60 may iteratively process the original data to generate a suitably small residual value and continue onto determining a final deblended output. However, this may take more than one iteration of processing. In this way, the final deblended output may be an updated primary signal estimate (since the method 200 is directed towards separating coherent signals from non-coherent signals to determine a primary signal estimate), or a weighted sum of the updated primary signal estimate and the primary signal estimate from previous iterations. At each iteration, an iteration count may increase by one, or other suitable increment (or decrement, in some embodiments). Thus, at block 204, the computing system 60 also may check to see if the iteration count threshold is met, or whether the iteration count exceeds a threshold number of iterations to be performed. Before performing other operations, the iteration count initially equals zero, where the iteration count threshold may not equal zero. Even if the residual is not suitably small, if the iteration count threshold is met, the computing system 60 continues onto block 206 to continue the method 200. This helps to cap processing resources spent by the computing system 60 on making the residual a suitable amount (e.g., residual=0).

In response to the residual not equaling the suitable amount, such as zero, or in response to the iteration count threshold not being met, the computing system 60 may continue the method 200 at block 208. To describe the method 200 at a high level, at block 208, the computing system 60 may perform processing operations to attempt to adjust the residual to a more favorable or more desirable amount (e.g., residual reduction operations to reduce the residual to a lower value or a more desirable amount).

More particularly, at block 222, the computing system 60 may perform combing operations. The combing operations may generate a combed residual that is used in the operations at block 230. The combing operations may include using a comb filter or performing comb filtering. Comb filtering may be performed by slicing a time window from the continuous recording for a given shot (named a trace from the given shot) with the start time of the window being the time of seismic source excitation of the given shot, repeating the slicing operation for every shot, and sorting the traces based on a desired shot grid. However, expanding the slicing of the time window to include data for the given shot before the time of seismic source excitation of the given shot may improve seismic noise removal later on in the method 200 (e.g., using a negative time window or a partially negative time window). This negative time window can be on the order of 4-5 seconds, for example. Further details regarding combing operations are discussed in paragraphs describing at least FIG. 4, FIG. 5, FIG. 6, FIG. 7 and FIG. 8 of the copending, commonly-assigned U.S. patent application Ser. No. 12/542,433, issued as U.S. Pat. No. 8,295,124 on Oct. 23, 2012, which is hereby incorporated by reference herein in its entirety.

The computing system 60 may, at block 226, access memory buffers storing the current estimated deblended data (e.g., block 226). At block 230, the computing system 60 may sum each current estimated deblended data with its corresponding combed residual (e.g., at block 230).

As described above, sometimes the computing system 60 may apply operations of the method 200 to deblend a gather having data from two or more types of sources. When separating different types of sources, it may be desired to balance their amplitudes, otherwise one source type may dominate over the other and the processing operations may not converge to a steady value or a zero value. Thus, at block 236, the computing system 60 may balance the relative strengths of the different types of sources and/or attenuate frequencies not produced by the corresponding source (e.g., block 236). Attempting to produce a coherent signal that is not there, for example, attempting to find a coherent signal above 4 Hz for a low-frequency source that produces little to no energy in that frequency band, may be generally inefficient. Furthermore, attempting to do so may accentuate noise which may cause outputs of the computing system 60 performing operations of the method 200 to not converge at a usable result. Thus, the modified method 200 includes an additional time and/or frequency weighting operation to attenuate frequencies not produced by the corresponding source (e.g., block 236).

The computing system 60, at block 240, may smooth the data to extract coherent signals from non-coherent signals (e.g., block 240). At block 240, the computing system 60 may perform a coherent signal extraction (e.g., block 240). A Fourier Transform may be used for the coherency-based signal extraction. However, it is noted that the Fourier Transform may be substituted with other sparsity promoting methods, such as Radon Transform, Singular Vector Decomposition, Singular Spectrum Analysis, or the like.

The coherency-based signal extraction may include the computing system 60 accessing at least a portion of traces in selected shots associated with a selected seismic receiver 36, 44, 46. The computing system 60 may organize the data into an appropriate gather corresponding to its source 32, 40. The computing system 60 may perform a Fourier Transform on the traces of the gather in the time and space directions, such that the desired signal may become "sparse" in that domain. After the Fourier Transform, the computing system 60 may attenuate noise (e.g., non-coherent signals, weak-coherence signals) and/or enhance coherent energy (e.g., coherent signals) in the transformed gather. In this way, values smaller than a threshold value in the transformed space may be zeroed while leaving the coherent signal (larger than the threshold value) untouched or subtracting the amplitude of the coherent signal by the threshold value. After attenuating the noise, the computing system 60 may perform an inverse Fourier Transform to return the data in the transformed gather to its original domain.

The computing system 60 may separate interfering source excitations into a source gather (or named common receiver gather) based at least in part on a threshold parameter (e.g., a threshold amount). The threshold parameter may correspond to the amount of coherency in the sparse promoting domain, over which signals may be passed through and later be transformed back to time space domain as primary signals. The threshold value decreases gradually to allow more coherent signals to be extracted, although it is unnecessary to have the threshold value decrease monotonically. The threshold parameter may permit at least a first coherency constraint (e.g., parameter) to be used to separate at least a portion of data for the first seismic source from at least an additional portion of data for the neighboring shot of the first seismic source. In some cases, the computing system 60 may separate the non-coherent signals determined into additional coherent signals and additional non-coherent signals. In these cases, the computing system 60 may combine the additional coherent signals to update a value of the residual.

The computing system 60 may generally segment data into overlapping N-dimensional subcubes, with appropriate tapering in the overlap zones. In these embodiments, the computing system 60 may perform the coherency-based signal extraction for each subcube, and the results of each respective performance of the method may be merged back together to reconstitute a coherent part of the original data.

In some embodiments, the computing system 60 may, at block 244, perform additional time and/or frequency (un) weighting to remove at least in part (e.g., partially or wholly) weights previously applied at block 236. However, the computing system 60 may not remove weights applied to suppress noise. The result is an update to the estimated deblended signal that the computing system 60 may, at block 248, add to the previous estimate (e.g., received respectively from block 226) with a stabilization weight to produce updated deblended signal estimates. The computing system 60 may store updated deblended signal estimates in the respective data buffers, at block 252. The updated deblended signal estimates at block 252 may contain leaked signals (e.g., weak primary signals misplaced near strong primary signals as depicted in FIG. 6B). A recovery operation at block 254 may be executed to reallocate the misplaced signals to the right position (thereby updating the estimates for the signal stored in the second data buffer received at block 226). Further details regarding these recovery operations are discussed in recently filed U.S. Patent Provisional Application No. 62/819,145, and recreated via FIG. 9. The computing system 60 may update the estimated deblended signal estimate at block 226 for the next iteration, and respectively blend the deblended traces, at blocks 256, for the source.

The computing system 60 may negate the updated estimates of the recorded data (e.g., multiplication operations at block 258), and may add the updated negative estimate from the recorded data (e.g., output from block 258), and the recorded data (e.g., represented by block 260) at block 262 via summation operations, generating an updated residual. The computing system 60 may store the newly updated residual in its corresponding data buffer (e.g., first data buffer) at block 264.

The computing system 60 may repeat the determination, at block 204, of whether updated residual estimate equals zero or whether the iteration count now meets a threshold (e.g., iteration count now equals one). When the computing system 60, at block 204, determines that either the residual (e.g., initial residual or the updated residual estimate) equals zero or the iteration count threshold is met, the computing system 60 proceeds in the method 200 to block 206. The computing system 60 may repeat the method 200 until the end condition is met. In this way, the method 200 represents, at least in part, an iterative process that generally is to be performed over a series of iterations. Note that if the prediction were perfect, unblended single-source-type predictions (e.g., outputs associated with block 258) may sum, at block 262, to the actual recorded data, and the newly updated residual is zero. The deblending operations described herein generally produce an improved result relative to other acquisition techniques. For example, the described deblending operations are relatively faster, where a shorter acquisition time may translate into a smaller amount of noise for an equivalent quantity of signals.

Figure 10:
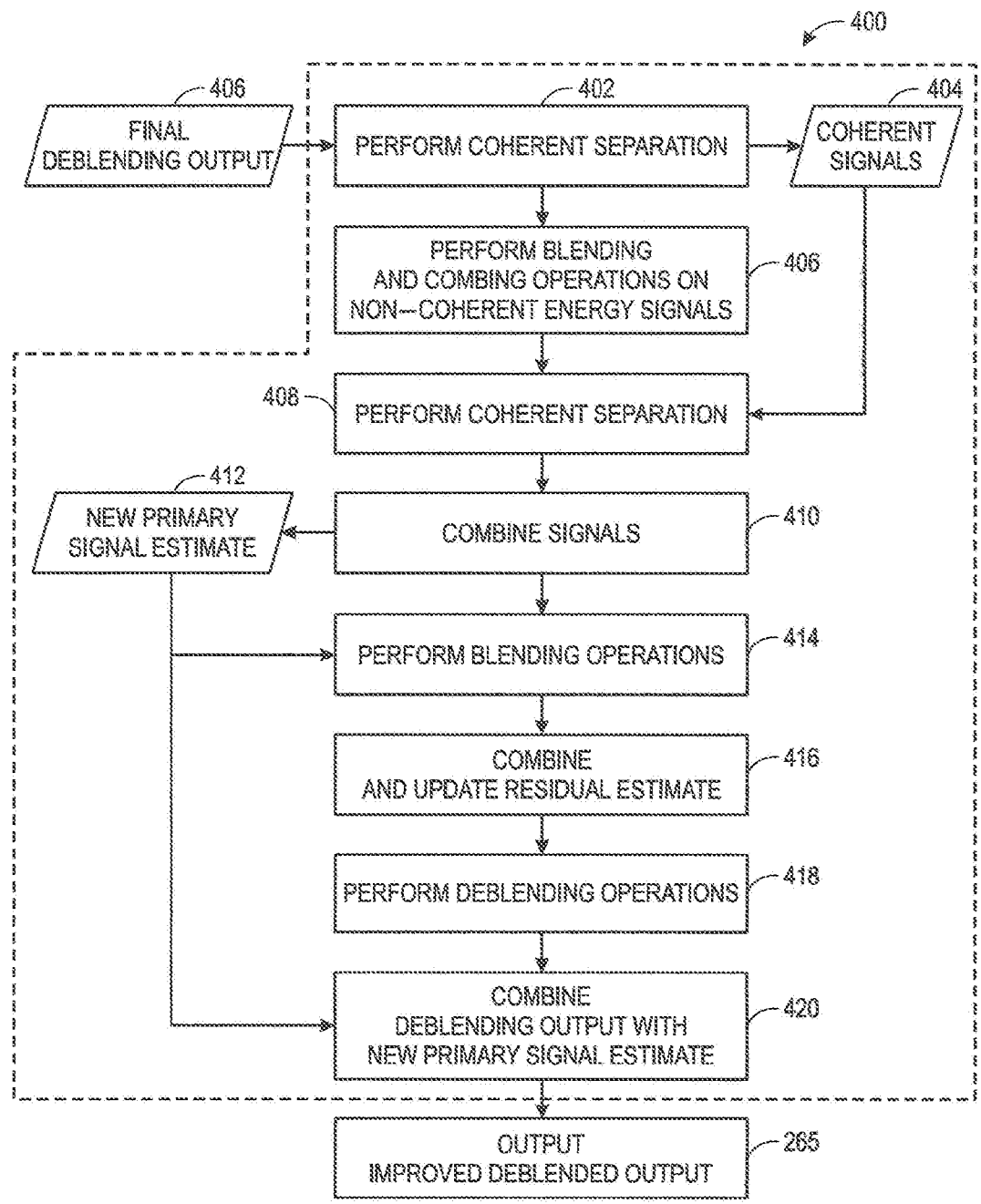
FIG. 10 illustrates a flowchart of a method for signal recovery of signals leaked into the recording of another source excitation or negative time window after the iterative inversion-based deblending operations of FIG. 7, in accordance with embodiments presented herein.

At block 204, when the computing system 60 determines that the end condition is met, the computing system 60, at block 206, halts the deblending operations and outputs the signal estimate. The recovery operation of leaked signals may also be executed at block 265 after the inversion iterations, instead of during the iterative inversion at block 254. The flowchart of the recovery operation after iterative inversion is depicted in FIG. 10. The signal estimate (e.g., deblending output, deblended output) is then filtered, at block 266, before the time of seismic source excitation of the given shot or before the estimated earliest time when the seismic energy reaches the receiver. Sometimes the filtering operations are defined in terms of an indicated time, where the indicated time and the time of the seismic source excitation of the given shot jointly define a time duration before the time of seismic source excitation of the given shot that is subjected to filtering operations. In this way, filtering may remove noise that had migrated during the processing operations of the method 200 into the portion of the gather before the time of seismic source excitation of the given shot. In some examples, the filtering operations of block 266 remove all portions of the deblended output corresponding to the duration of time between the indicated time and the time of the seismic source excitation. The filtering of the gather may improve signal quality because the filtering removes the migrated noise and leaves behind coherent signals.

Figure 8:
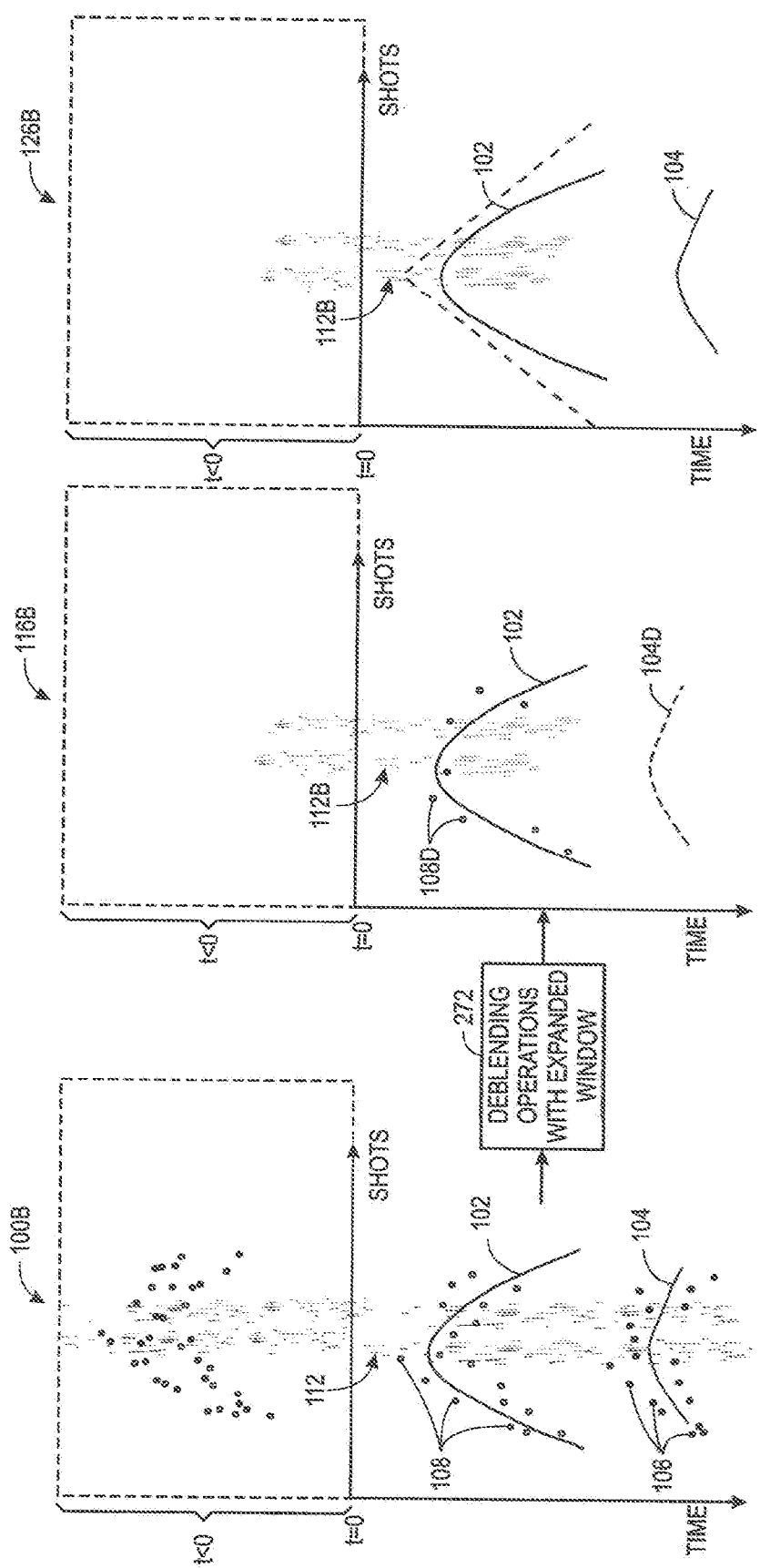
FIG. 8 illustrates a visualization of the inversion-based deblending operations of FIG. 7 that leverage an expanded window, in accordance with embodiments presented herein.

FIG. 8 illustrates a visualization of the inversion-based deblending operations of FIG. 7 that leverage an expanded gather window. In particular, FIG. 8 depicts operations associated with allocating noises unrelated with blending noise into an expanded gather window at block 230, the output of primary signal estimate at block 206, leaked signal recovery at block 265 and the filtering of the output at block 266. FIG. 8 includes the graph 100B which is similar to the graph 100 in FIG. 6A except that the time window is expanded to include time before seismic source excitation (t<0), a graph 116B showing an example of the output from block 206, and a graph 126B showing an improved output with leaked signals recovered in block 265 and filtered in block 266 when the computing system 60 ends deblending operations.

As a reminder, the graph 100B depicts a strong primary signal 102, a weak primary signal 104, blending noise 106 of the strong primary signal 102, blending noise 108 of the weak primary signal 104, and noises 112 generated by other sources, such as ocean swell noise during marine acquisition, other seismic interference noise from a nearby seismic survey, wind noise, vehicle noise, and the like. The gather corresponding to the shot depicted in graph 100B may have an expanded gather window (e.g., includes data before t=0 corresponding to a time of seismic source excitation). Deblending operations 272 that leverage the expanded gather window may improve the coherent signal, may separate coherent signals from noise (as shown in graph 116B, the signal 104D reveals weak coherence signals originally covered by noise 108), and may transfer at least some of the noise to one or more times before the time of the seismic source excitation (e.g., as part of a migration of at least some of the noise). The deblending operations 272 may include some or all of the operations of the method 200. For example, the deblending operations 272 iteratively performed on the gather may include a combination of operations of block 204, 222, 236, 240, 244, 248, 252, 254, 256, 258, 262, and 264.

The migration of the noise enabled via the deblending operations 272 is visualized in the graph 116B. In the graph 116B, some of the noise from after the time of seismic source excitation of the given shot is migrated to be in one or more times before the time of the seismic source excitation. It may be observed that some of the weak primary signals are leaked or misallocated near the strong primary signals, as shown as 108D. The operation 265 to recover the leaked energy may be executed and may yield the result in FIG. 126B. Once some of the noise is transferred to a time before the time of the seismic source excitation (e.g., t<0), the computing system 60 may filter data of the gather. The filtering of the data may remove noise present in the dataset from before the time of the seismic source excitation (e.g., filtering to remove data corresponding to time less than 0, t<0) or before the earliest arrival time of seismic wave travelling from the source location to the receiver location. Filtering of the migrated noise may reduce noise of the gather and/or of the coherent signal.

Figure 9:
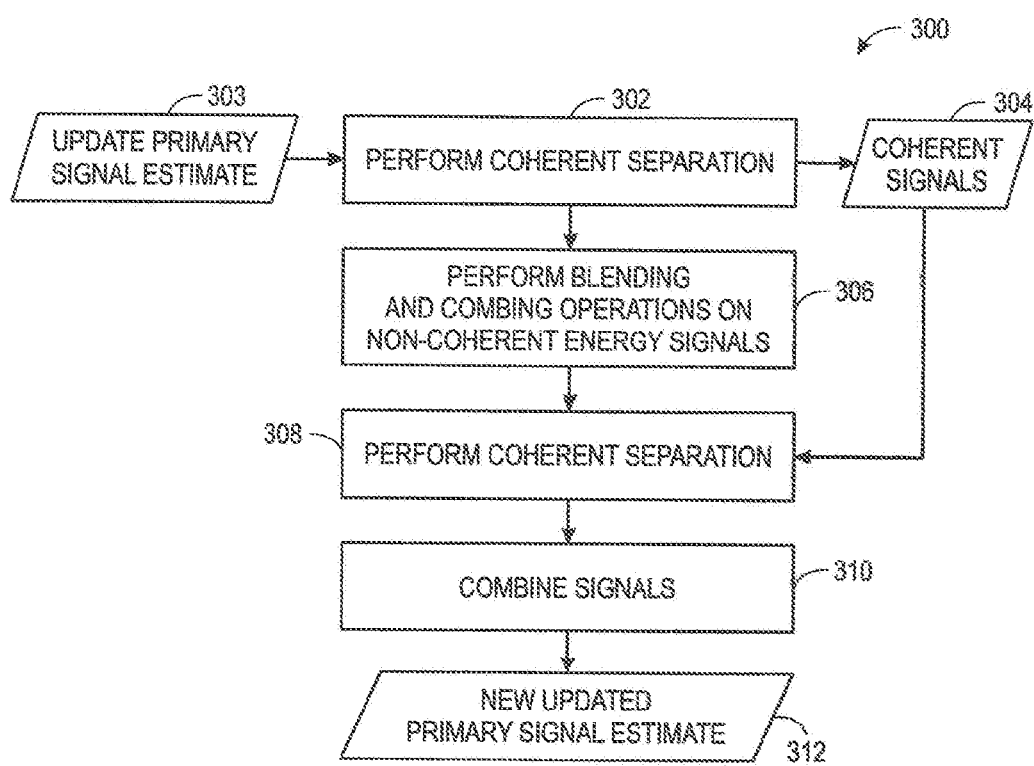
FIG. 9 illustrates a flowchart of a method for signal recovery of signals leaked into the recording of another source excitation or negative time window during the iterative inversion-based deblending operations of FIG. 7, in accordance with embodiments presented herein.

FIG. 9 illustrates a flowchart of recovering leaked or misallocated signals during the iterative primary signals estimate in block 208. The blending noise which leaks into primary signal estimate at block 240 of the method 200, in response to the signal extraction operations, may be recovered to be placed back to the correct time window. It should be understood that FIG. 9 merely depicts an example method to be used to perform operations described at the block 254 of FIG. 7, therefore other suitable methods, process, or procedures may be used to also perform operations described at the block 254. Although the following description of the method 300 is detailed in a particular order to facilitate explanation, it should be noted that the operations of the method 300 may be performed in any suitable order. Moreover, although the method 300 is described as being performed by the computing system 60, it should be understood that the method 300 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory medium).

Continued from block 252 of FIG. 7, the computing system 60, at block 302, may perform coherent separation operations on the updated primary signal estimate 303 output from block 252. At this point, the computing system 60 may filter out seismic energy that is non-coherent in the deblended signal by using random noise removal processes, such as frequency-space (f-x) predictive deconvolution, vector median filter, or any other suitable means of random noise removal. Resulting from these operations are outputs including coherent signals 304, or signals associated with coherent energy, and non-coherent signals, or signals classified as being associated with noise or interference. In general, coherence refers to a statistic that may expose a relationship between two signals or two data sets and may be used to determine a relationship between an input and an output, which thus may be applied to determine whether particular signals are noise. The non-coherent signals may include blending noise, and thus operations are to be performed to recover any relevant signals (e.g., additional coherent signals) from the non-coherent signals.

Thus, to facilitate recovering coherent signals from the non-coherent signals, the computing system 60, at block 306, may perform blending and combing operations on the non-coherent signals from the block 302. Here, the non-coherent signals are blended into continuous data by sliding the time windows having respective shot times and adding the time windows together. The combing operation may convert the summed continuous data back to the gathers of time windows. The gathers are to be processed to facilitate signal-noise separation operations.

At block 308, the computing system 60 may perform the coherent separation operations again on the non-coherent signals after the blending and combing operations. In some cases, coherent signals may be leaked into non-coherent signals that result from the coherent separation operation performed at block 302. As part of the blending and combing operations performed on the non-coherent signals from block 302, in these cases, the non-coherent signals are to be separated from the combed gather generated at block 306. The computing system 60 therefore repeats the noise removal processes, such as frequency-space (f-x) predictive deconvolution, vector median filter, singular value decomposition or any other suitable means of noise removal. The coherent separation operations of the block 308 may be applied on a different dimension or using different techniques or using the same techniques but different parameterization when compared to the block 240. For example, the separation operations at block 240 may use three-dimensional regularization and frequency-wavenumber (f-k) transform, while the separation operations at block 302 may use two-dimensional regularization and a vector median filter, and the separation operations at block 308 may use two-dimensional regularization and a frequency-space (f-x) predictive deconvolution. Repeating the coherent separation operations permits the computing system 60 to separate additional coherent signals from the overall non-coherent signals in the primary signal estimate (e.g., signals classified as non-coherent). The computing system 60 uses the resulting coherent signals at block 310 and may discard or disregard the resulting non-coherent signals.

At the block 310, the computing system 60 may combine the resulting coherent signals from the coherent separation at the block 308 with the resulting coherent signals 304 from the coherent separation at the block 302. If the deblending performed using the method 240 of FIG. 8 is doing a suitable job, the blended and combed result from block 306 remains non-coherent, thus no signals are generated at the block 308 and combined with the coherent signals 304. However, if there were coherent signals within the blended result at the block 306, the coherent signals have been misplaced and may be captured and recombined with the coherent signals 304. The coherent signals determined at the block 308 and the coherent signals 304 are added (or otherwise summed after being adjusted via a modifying weight) together with the resulting non-coherent signals generated at block 302 with a weight. The resulting combination of the coherent signals becomes the new updated primary signal estimate 312.

It is noted that when method 300 is performed iteratively, one or more extracted (e.g., iteratively extracted) coherent signals that were misplaced may be combined at this portion to determine the updated signal estimate, and that any suitable number of iterations of blocks 302, 306, and 308 may be included in the method 300. The computing system 60 may track iterations and end iterative performance of at least a portion of the method 300 in response to a threshold parameter being met and/or exceeded. This end condition (e.g., exceeding the threshold parameter) may indicate a suitable number of iterations. The end condition may be an iteration threshold associated with a maximum number of times a value of the residual may be iteratively updated. In this way, the method 300 may be repeated until the new updated primary signal estimate is suitably converged upon. The computing system 60 may continue at the block 256 of FIG. 7 to perform blending operations using the new updated primary signal estimate 312. Upon the computing system continuing the method 200 after performing the method 300, the final deblended output 206 may include one or more previously misplaced signals that have been captured (e.g., recovered) and recombined with initially identified coherent signals associated with a primary signal estimate.

FIG. 10 illustrates a flow chart of a method 400 to determine an updated deblending signal that includes performing at least some of the operations described above with respect to FIG. 9. The method 400 describes a process that may be retrofitted onto existing processing and capturing systems to improve the final deblended output 206. This retrofitting may be permitted by using one or more processors or computing systems in addition to the computing system 60, such that the additional computing systems may receive outputs from the computing system 60 to perform the overall method. Although two or more processors or computing systems may be used, one computing system 60 is described herein as performing the method 400. Although the following description of the method 400 is detailed in a particular order to facilitate explanation, it should be noted that the operations of the method 400 may be performed in any suitable order. Moreover, although the method 400 is described as being performed by the computing system 60, it should be understood that the method 400 may be performed by any suitable computing system, computing device, and/or controller. In this way, it should also be understood that some or all of the below described processing operations may be performed by one or more components of the computing system 60, including the processor 64, the memory 66, or the like, and may be executed by the processor 64, for example, executing code, instructions, commands, or the like stored in the memory 66 (e.g., a tangible, non-transitory medium).

At block 400, the computing system 60 may receive the final deblended output from the block 206 of FIG. 7 and perform leaked signal recovery described at the block 265 of FIG. 7. For ease of discussion, discussion regarding details about the coherent separation performed at the block 402 of FIG. 10, the blending and combing operations performed at block 406 of FIG. 10, and the repeating of the coherent separation at block 408 of FIG. 10 from above are relied upon herein since some processes are the same between the method 400 and the method 300 of FIG. 9. Thus, at the block 406, the computing system 60 may perform blending and combing operations on the resulting non-coherent signals from the coherent separation at the block 402. In some cases, coherent signals may be leaked into non-coherent signals that result from the coherent separation operation performed at block 402. As part of the blending and combing operations performed on the non-coherent signals from block 402, in these cases, the non-coherent signals are to be separated from the combed gather generated at block 406. At the block 408, the computing system 60 may repeat performance of the coherent separation (e.g., coherent separation of block 402) on the blended and combed output from the block 406. At this point, the computing system 60, at block 410, may combine coherent signals 404 (generated during the coherent separation operations at the block 402), the coherent signals resulting from the coherent separation of the block 408 and the resulting non-coherent signals generated at block 402 to generate a new primary signal estimate 412. The combination may be a straight sum (e.g., not adjusted via a modifying weight value) or weighted sum (e.g., adjusted via a modifying weight value). The new primary signal estimate may be used when performing blending operations, at block 414, in a manner similar to the discussion earlier with regard to the block 256 of FIG. 7.

The computing system 60, at block 416, may combine the outputted blended continuous data of estimated primary signal with the original blended continuous data, as described earlier with respect to the block 252 of FIG. 7. In some embodiments, the outputted blended continuous data is multiplied by a negative constant (e.g., −1) to adjust the value of the data before being combined with the original blended continuous data.

At block 418, the computing system 60 may perform deblending operations using the residual output from the block 416. The deblending operations may facilitate separating blending noise from noise signals within the residual estimate outputted from the block 416. The weak coherence signals generated at block 418 may be combined (e.g., additively combined) with the new primary signal estimate 412 at block 420. Any suitable method or means of combining the signals may be used, including processing circuitry that operates to add signal values together. It should be noted that the deblending operation in block 418 may be replaced by weighting the residual output from the block 416 with a blending fold (e.g., at any given time, a number of seismic shots within an effective time window being recorded) or variations of the blending fold, such that blending the weighted residual output from block 418 generates the residual output from block 416.

After combining the weak coherence signal generated at block 418 and the new primary signal estimate 412, at block 265, the computing system 60 may output an improved deblended output that includes results of a single iteration of deblending signal recovery operation. In this way, the improved deblended output may include at least some weak coherence signal that previously, such as when using the final deblended output, was previously leaked into other coherent signals. Thus, this final deblended output may include one or more previously misplaced signals that have been captured (e.g., recovered) and recombined with initially identified coherent signals associated with a primary signal estimate. The output of block 265 may be the input (e.g., block 206) of block 402 if additional weak coherence signals are able to be recovered.

In this way, a second processor may update the value of the residual after determining a final deblended output as part of the above-described retrofitted operations performed in addition to one or more operations (e.g., that may be performed by a first processor and/or performed by software, an application, for the like), such that a final deblended output of the one or more operations are improved. The second processor may output an improved deblended output as the deblended output at the block 265. This improved deblended output may include at least some recovered coherent signals from the noise signals associated with the final deblended output 206, such as the final deblended output 206.

To reiterate methods described above, the computing system 60 may determine a residual associated with input seismic data received from a seismic source (e.g., block 208). The input seismic data may include data received before a time of a seismic source excitation that generated the input seismic data, such that the data corresponding to times before the time of the seismic source excitation may be included in a gather via an expanded gather window (e.g., the expanded negative time window includes seismic energy generated by the blending source excitations). The residual may indicate a difference between expected input seismic data and input seismic data. The expected input seismic data is determined by blending primary signal estimates with time shifts applied to the primary signals based on a time of seismic source excitations that generated the primary signals. This primary signal estimate may initially be set to zero (e.g., block 202) but may change as the computing system 60 performs additional iterations of the deblending operations. In this way, the computing system 60 may iteratively update a value of the residual based at least in part on separation operations. Since the gather generated during combing operations uses an expanded gather window, the separation operations may also accommodate the expanded gather window and additional data. The separation operations may include the computing system 60 filtering coherent signals associated with residual data, or a sum of the residual data and a current primary signal estimate, into a first subset of signals. The separation operations may additionally or alternatively include the computing system 60 filtering non-coherent signals associated with the residual data into a second subset of signals.

The computing system 60 may generate additional coherent signals with correct timing from misplaced signals within the first subset of signals. This may involve iteratively extracting and re-allocating additional non-coherent signals of the first subset of signals, where the additional non-coherent signals are at least a less-coherent portion of the first subset of signals relative to more-coherent portions of the first subset of signals (e.g., at block 240). In response to satisfying the computing system 60 determining an end condition is met (e.g., at block 204), the computing system 60 may transmit a deblended output that is determined based at least in part on the first subset of signals and the additional coherent signals. Additional coherent signals which are leaked or misallocated during the separation operations may be reallocated to the correct source excitation and timing through an additional signal recovery operation (e.g., block 265) after the deblending iterations complete. The computing system 60 may also filter the deblended output to remove a portion of the deblended output that is before the time of the seismic source excitation or before the predicted earliest arrival time of seismic wave travelling from each source to the receiver (e.g., at block 266). This filtering may reduce noise in the final deblended output that is used in generating a seismic image of hydrocarbons in a subsurface region of Earth and/or subsurface drilling hazards.

In some cases, the computing system may use the separation operations to separate the residual (or a sum of the residual and the primary signal estimate) to generate the first subset of signals. In these cases, the computing system 60 may determine an updated primary signal estimate that identifies a coherent energy for a particular input seismic data collection period, and may use the updated primary signal estimate to generate the deblended output.

With the foregoing in mind, a device may include a processor that may separate or deblend signals acquired with simultaneous source shooting, in an environment with background noise or other types of noises. The processor may use a presumption that no signal may be recorded before it is generated and may expand a receiver gather before the time of source excitation. The expanded time window may partially store the background or other types of noises during the deblending iterations and may permit an improved separation of the weak primary signals overlapped with these noises. The processor may iteratively update the primary signal estimate based at least in part on a separation operation that separates coherence signals from noise signals in an output associated with the residual determined to be remaining energy for separation. The processor may deploy signal recovery operations to reallocate leaked or misplaced signals created during the separation iterations, to the correct source excitation and timing. The signal recovery operations may be incorporated into the iterative primary signal estimate of the deblending process or be applied towards preexisting deblending output. In response to satisfying an end condition, the processor may transmit a deblended output that includes the weak primary signals separated from the background or other types of noises and the blending noises, wherein filtering may be applied to the background or other types of noises by removing data associated with a time before a time of seismic source excitation or before the predicted earliest arrival time of the seismic wave travelling from the source location to the receiver location. The processor may also transmit the deblended output for use in generating a seismic image. Thus, technical effects of this disclosure include designs and methods for improving operations when other types of noises are present in the data such that the noises overlap with weak coherence signals and strong blending noise at the same time. The expanded window during the deblending operations may help in allocating these noises in the expanded window, and thus a better separation may be achieved between the weak coherence signals and strong blending noise. The weak coherence signals discarded and misallocated to other coherent signals during the separation operations may be recovered better with the absence of overlapping background noises. In particular, the disclosed methods and data editing techniques include processes for expanding a gather window used during combing and deblending operations. By expanding the gather window, noise present in the gather after a time of seismic source excitation for a given shot may migrate to before the time of the seismic source excitation via the deblending operations. The transferred noise may be filtered and removed, thereby improving the coherent signal and the gather by reducing noise present in the dataset after deblending operations finish. These operations may cause improved data inputs into seismic image generators. When data inputs into the seismic image generators are improved, the resulting seismic image may also improve, causing an improvement of a representation of hydrocarbons in a subsurface region of Earth or of subsurface drilling hazards.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of seismic exploration above a region of subsurface containing structural or stratigraphic features conducive to determining a presence, migration, or accumulation of hydrocarbons, the method comprising:
accessing, by a processor of a computer system, at least a portion of a seismic source survey, wherein the seismic source survey corresponds to a seismic source excitation, wherein the seismic source excitation is produced by a seismic source that imparts seismic energy into the region of the subsurface, and wherein the at least the portion of the seismic source survey comprises data corresponding to at least one time before a time of the seismic source excitation;
separating, by the processor, a coherent signal from the at least the portion of the seismic source survey comprising the data corresponding to the at least one time before the time of the seismic source excitation via a combing and deblending operation, wherein the combing and deblending operation is an iterative operation configured to predict at least a portion of weak-coherence signals caused by the seismic source excitation, and wherein the combing and deblending operation is based at least in part on a gather comprising the at least the portion of the seismic source survey corresponding to the at least one time before the time of the seismic source excitation;
identifying, by the processor, leaked signals that are misallocated as being associated with strong primary signals during the separating, wherein the leaked signals are associated with a previous time window before the time of the seismic source excitation;
allocating, by the processor, the at least the portion of the leaked signals in the gather to the previous time window before the time of the seismic source excitation; and
producing, by the processor, a receiver gather based on the separating and the coherent signal, wherein the receiver gather is a recording of multiple source excitations on a receiver, and wherein the receiver gather is evaluated to identify locations within the region of the subsurface that include hydrocarbon deposits and subsurface drilling hazards to determine a drilling path into the region of the subsurface for extracting the hydrocarbon deposits; and
based on the receiver gather, drilling the identified locations within the region of the subsurface that includes hydrocarbon deposits and subsurface drilling hazards.

2. The method of claim 1, comprising:
determining, by the processor, a residual value;
in response to the residual value being less than or equal to a threshold, outputting, by the processor, the coherent signal for use in the exploration for hydrocarbons; and
in response to the residual value being greater than the threshold, repeating, by the processor the combing and deblending operation to determine an updated residual value.

3. The method of claim 1, comprising:
generating, by the processor, a deblended output via the combing and deblending operation; and
filtering, by the processor, the deblended output to remove a portion of the deblended output that is before the time of the seismic source excitation or before a predicted earliest arrival time of a seismic wave travelling from a source location to a receiver location.

4. The method of claim 3, comprising
selecting, by the processor, a coherency constraint for the seismic source;
applying, by the processor, the coherency constraint during the combing and deblending operation to the at least the portion of the seismic source survey; and
producing, by the processor, the receiver gather based at least in part on an output generated from the applying of the coherency constraint.

5. The method of claim 3, wherein the filtering of the deblended output performed using a combination of hardware filtering circuitry and software filtering operations.

6. The method of claim 3, comprising filtering, by the processor, the deblended output to remove all portions of the deblended output corresponding to a duration of time between an indicated time and the time of the seismic source excitation.

7. The method of claim 3, comprising:
determining, by the processor, an iteration count; and
in response to the iteration count being less than a threshold:
repeating, by the processor, the combing and deblending operation to determine an updated residual value; and
incrementing, by the processor, the iteration count.

8. The method of claim 3, comprising:
modifying, by the processor, the receiver gather via the combing and deblending operation to cause a migration of noise from a first portion of the receiver gather disposed after the time of the seismic source excitation toward a second portion of the receiver gather disposed before the time of the seismic source excitation.

9. The method of claim 3, comprising:
initializing, by the processor, the deblended output to zero; and
modifying, by the processor, the deblended output over one or more iterations of the combing and deblending operation to a non-zero value.

10. The method of claim 3, comprising:
recovering, by the processor, the leaked signals generated during deblending iterations via a series of coherence-based separation, blending and combing operations.

* * * * *